H. L. MENDAL.
COMBINATION COOKING UTENSIL.
APPLICATION FILED JUNE 18, 1914.

1,212,661. Patented Jan. 16, 1917.

Witnesses:
Donald P Armstrong
Eugene Harper

Inventor:
Henry Lloyd Mendal.

UNITED STATES PATENT OFFICE.

HENRY LLOYD MENDAL, OF TAMPA, FLORIDA, ASSIGNOR OF ONE-FOURTH TO KATE M. LANGLEY, OF BALTIMORE, MARYLAND.

COMBINATION COOKING UTENSIL.

1,212,661. Specification of Letters Patent. Patented Jan. 16, 1917.

Application filed June 18, 1914. Serial No. 845,919.

*To all whom it may concern:*

Be it known that I, HENRY LLOYD MENDAL, a citizen of the United States, residing at 1418 Florida avenue, city of Tampa, in the county of Hillsborough and State of Florida, have invented a new and useful Combination Cooking Utensil, of which the following is a specification.

My present invention relates to certain new and useful improvements in combination cooking utensils and more particularly to a device of this character that is so constructed and provided with means to support the frying pan or a similar article in connection therewith and thus utilize the heat products which would, under ordinary circumstances be wasted.

Another object of the invention is to provide the cooking utensil with a central flue that is capable of receiving a pan supporting structure directly in the path of the hot air traveling through the flue; the pan supporting structure, in itself, being so constructed whereby it may be received in the flue and supported therein without the necessity of providing any fastening means whatsoever.

Various other objects and advantages will become apparent during the continuance of the following description.

The above and other objects which will become apparent, are accomplished by such means as are shown in their preferred form in the accompanying drawings, described in the following specification and then more specifically pointed out in the appended claims.

Figure 1:
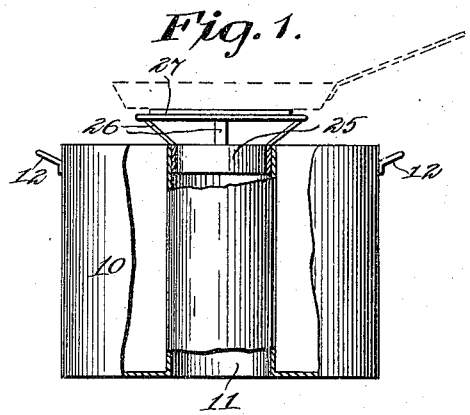
Figure 2:
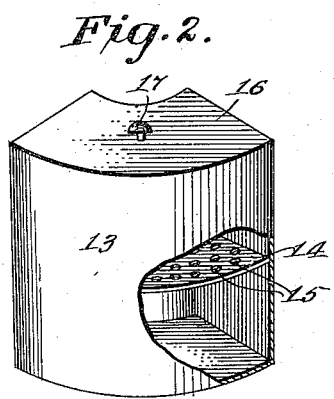
Figure 3:
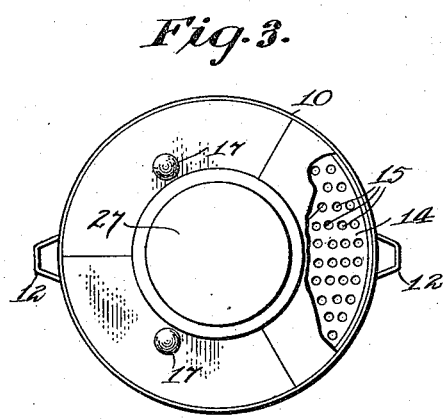

In the accompanying drawings wherein like characters designate like parts throughout the views; Figure 1 is a view in side elevation of the container showing parts thereof broken away and illustrating my improved pan supporting structure in conjunction with the heat conducting flue thereof. Fig. 2 is a view in perspective of one of the cooking receptacles. Fig. 3 is a view in top plan of the container showing the pan supporting structure in conjunction therewith.

My invention consists generally of a container body 10 which is preferably constructed of metal in order that the same will be durable and be able to withstand the various knocks and jars to which a device of this character is generally subjected. The container 10 is provided with a centrally arranged conducting flue 11 which is open at both ends and which is preferably formed integral with the container body. In the event that the outer wall of the container body is made to extend upwardly to a point adjacent the upper end of the flue 11, handles 12 may be provided thereon for the purpose of facilitating the manipulation of the device.

A series of receptacles 13 are provided and are so formed whereby they may be made to fit snugly within the container body in engagement with the interior wall of the conducting flue. Each of the receptacles 13 is provided with an interposed supporting plate 14 which in the present embodiment is shown to be perforated as at 15. Plates 14 serve to support the food stuffs within the receptacles and provide means to prevent the burning of the latter during the course of cooking. Detachable cover members 16 are also arranged in conjunction with each of the receptacles 13 and are in turn provided with handles 17 whereby they may be easily and quickly moved into or out of an operative position.

In Fig. 1 I have illustrated the preferred form of pan supporting means which includes an annular collar 25 which is normally seated within the flue 11 in proximity to the upper end thereof. The collar 25 carries a plurality of arms 26 which project therefrom upwardly and outwardly and support at their upper ends a pan receiving plate 27. However the arms 26 serve to engage the upper edge of the conducting flue and consequently provide for supporting the entire device. The greatest of stress is directed to the particular form of pan supporting means shown in Fig. 6 as this form has proven very efficient and it has been found that the same greatly adds to the efficiency of the entire combination vessel.

In reducing my invention to practice I find that the form referred to herein, as the most practical and preferred embodiment, is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent is:

1. The combination with a cooking utensil, including a vertically disposed heat conducting flue, of a collar frictionally engaging the inner wall of said flue, a plurality of arms extending upwardly and outwardly from said collar and engageable with the upper edge of said heat conducting flue and a supporting plate carried by said arms above the upper edge of said flue, whereby by reason of their engagement with the upper edge of said flue, said arms serve to relieve said collar of the weight of said plate.

2. The combination with a cooking utensil, including a heat conducting flue open at its upper end, of a pan supporting plate, a collar fitting within said flue, a plurality of supporting arms connecting said collar and said plate and disposed diagonally to ride upon the upper edge of said flue, said supporting arms retaining said plate in spaced relation to the upper edge of said flue thereby permitting the heat products to escape from said flue beneath said plate and said arms relieving said collar of the weight of said plate, substantially as described.

HENRY LLOYD MENDAL.

Witnesses:
N. D. SMITH,
CHAS. NAVY.

Copies of this patent may be obtained for five cents each, by addressing the "Commissioner of Patents, Washington, D. C."